United States Patent [19]

Ogawa et al.

[11] Patent Number: 5,227,222
[45] Date of Patent: Jul. 13, 1993

[54] IN-MOLD DECORATED ILLUMINATION PANEL

[75] Inventors: Yasuaki Ogawa, Furukawa; Yasushi Takeda, Miyagi; Akira Sakai, Miyagi; Takejirou Takeda, Miyagi; Akihiro Nakamura, Miyagi; Hiroyuki Miyaguchi, Furukawa, all of Japan

[73] Assignee: Alps Electric Co., Ltd., Tokyo, Japan

[21] Appl. No.: 823,091

[22] Filed: Jan. 21, 1992

[30] Foreign Application Priority Data

Jan. 28, 1991 [JP] Japan ............................ 3-007199[U]
Feb. 13, 1991 [JP] Japan ............................ 3-011990[U]

[51] Int. Cl.⁵ ............................................ B32B 9/00
[52] U.S. Cl. ................................... 428/195; 428/40; 428/412; 428/522; 428/332; 428/339; 264/266; 264/132; 264/247; 264/258; 156/240; 156/232
[58] Field of Search ................. 264/132, 200; 428/195

[56] References Cited

U.S. PATENT DOCUMENTS 3,784,664 1/1974 Nicklin .............................. 264/132
4,917,927 4/1990 Sakaitani et al. ................. 428/410
4,931,248 6/1990 Willemin ........................... 264/132

Primary Examiner—Patrick J. Ryan
Assistant Examiner—Abraham Bahta
Attorney, Agent, or Firm—Guy W. Shoup; B. Noel Kivlin; David W. Heid

[57] ABSTRACT

An in-mold decorated illumination panel including an indicator sheet, an ink printed layer formed on a back surface of the indicator sheet, the ink printed layer having a printed indicator portion, and a molded layer formed on a back surface of the ink printed layer by injection molding, wherein the printed indicator portion is illuminated from the back surface of the ink printed layer to effect indication of the printed indicator portion on a front surface of the indicator sheet. An ink dissolution preventing sheet is interposed between the ink printed layer and the molded layer for preventing ink of the printed indicator portion from being dissolved away by pressure of a molding material in the injection molding. A shrinkage adjusting material for adjusting molding shrinkage of the panel is mixed in the molded layer with a predetermined content such that a shrinkage rate of the molded layer becomes substantially equal to a shrinkage rate of the indicator sheet after the injection molding, whereby warping of the panel after the injection molding is prevented.

4 Claims, 6 Drawing Sheets

IN-MOLD DECORATED ILLUMINATION PANEL

BACKGROUND OF THE INVENTION

(1) Field of the Invention

The present invention relates to an in-mold decorated illumination panel, and more particularly to an in-mold decorated illumination panel having an indicator portion printed on a back surface of an indicator sheet.

(2) Description of the Related Art

It is known that an in-mold decorated illumination panel is used for a dash board of an automobile, for example. Such an in-mold decorated illumination panel is constructed of an indicator sheet having an indicator sheet such as an indicator symbol printed on a surface of the indicator sheet and a molded layer integrally formed on a back surface of the indicator sheet by injection molding. The indicator portion is illuminated from the side of the molded layer to effect indication of the indicator portion on a front surface of the indicator sheet. The indicator portion is printed on the front surface or the back surface of the indicator sheet.

In the former type such that the indicator portion is printed on the front surface of the indicator sheet, minute adjustment of illumination by ink cannot be effected because of unevenness of the front surface of the indicator sheet. Further, as the indicator portion is printed on the front surface of the indicator sheet, a crimp pattern of the front surface of the indicator sheet cannot be effectively utilized.

In order to effect the minute adjustment of illumination by adjusting a thickness and color of an ink printed layer and effectively utilize the crimp pattern of the indicator sheet, the latter type such that the indicator portion is printed on the back surface of the indicator sheet is currently adopted. FIG. 7 shows a construction of a conventional in-mold decorated illumination panel 1 of the latter type, in which an ink printed layer 3 including an indicator symbol (not shown) is formed on a back surface of an indicator sheet 2, and a molded layer 5 formed from ABS resin in directly formed on the ink printed layer 3 by injection molding.

However, the conventional in-mold decorated illumination panel 1 has a shortcoming such that the ink of the printed indicator symbol is dissolved away in the manufacturing step of injection molding. This problem is not so remarkable in the case that the panel 1 is relatively small in size as in the application to knobs, for example, but it becomes a serious problem in the case that the size of the panel 1 is large. That is, the larger the size of the panel 1, the more an injection quantity of hot molten resin upon injecting molding. As a result, a large injection pressure of the molten resin is directly applied to the ink printed layer 3, so that a large amount of ink of the indicator symbol is dissolved away. FIG. 8 illustrates the problem of dissolution of the ink. As shown in FIG. 8, the ink of a printed indicator symbol 6 is dissolved away to result in formation of a defective ink line 7 along an inside edge 5a of the molded layer 5 by the pressure of the molten resin upon injection molding. The formation of such a defective ink line 7 causes a problem such that illuminated indication of the indicator symbol 6 on the front surface of the indicator sheet 2 becomes unclear. Accordingly, in the case that the in-mold decorated illumination panel 1 is large to some extent, it is necessary to adopt a method of attachment of a face plate or multi-color molding, which causes complication of a manufacturing step of the panel 1.

Further, while there occurs warping of an illumination panel upon molding in general, it is known that the warping of the panel is physically corrected by providing a rib for preventing the occurrence of warping upon molding. However, in the in-mold decorated illumination panel 1 having the indicator sheet 2 and the molded layer 5 fixedly attached to each other, a shrinkage sheet 2 is different from that of the molded layer 5. It is therefore impossible to correct the warping of the panel 1 by providing the above-mentioned rib. Thus, the warping of the panel 1 as shown in FIG. 9 cannot be avoided.

SUMMARY OF THE INVENTION

It is accordingly an object of the present invention to provide an in-mold decorated illumination panel which can prevent the ink of the indicator symbol printed on the back surface of the indicator sheet from being dissolved away upon injection molding.

It is another object of the present invention to provide an in-mold decorated illumination panel which can prevent the occurrence of warping after injection molding.

According to one aspect of the present invention, there is provided in an in-mold decorated illumination panel including an indicator sheet, an ink printed layer formed on a back surface of said indicator sheet, said ink printed layer having a printed indicator portion, and a molded layer formed on a back surface of said ink printed layer by injection molding, wherein said printed indicator portion is illuminated from the back surface of said ink printed layer to effect indication of said printed indicator portion on a front surface of said indicator sheet; the improvement comprising an ink dissolution preventing sheet interposed between said ink printed layer and said molded layer for preventing ink of said printed indicator portion from being dissolved away by pressure of a molding material in said injection molding.

With this construction, even when the indicator sheet is large in size, and an injection pressure of molten resin accordingly becomes large upon injection molding, the large injection pressure is blocked by the ink dissolution preventing sheet and is not directly applied to the ink printed layer, so that the ink of the printed indicator portion can be prevented from being dissolved away.

According to another aspect of the present invention, there is provided in an in-mold decorated illumination panel including an indicator sheet, an ink printed layer formed on a back surface of said indicator sheet, said ink printed layer having a printed indicator portion, and a molded layer formed on a back surface of said ink printed layer by injection molding, wherein said printed indicator portion is illuminated from the back surface of said ink printed layer to effect indication of said printed indicator portion on a front surface of said indicator sheet; the improvement wherein a shrinkage adjusting material for adjusting molding shrinkage of said panel is mixed in said molded layer with a predetermined content such that a shrinkage rate of said molded layer becomes substantially equal to a shrinkage rate of said indicator sheet after said injection molding, whereby warping of said panel after said injection molding is prevented.

With this construction, the shrinkage rate of the molded layer can be reduced by the shrinkage adjusting material mixed in the molded layer. Since the content of the shrinkage adjusting material in the molded layer is selected so that the shrinkage rate of the molded layer becomes substantially equal to the shrinkage rate of the indicator sheet after injection molding, the occurrence of warping of the in-mold decorated illumination panel can be prevented regardless of possible shrinkage of the molded layer and the indicator sheet.

Other objects and features of the invention will be more fully understood from the following detailed description and appended claims when taken with the accompanying drawings.

DETAILED DESCRIPTION OF THE PREFERRED EMBODIMENT

Figure 7:
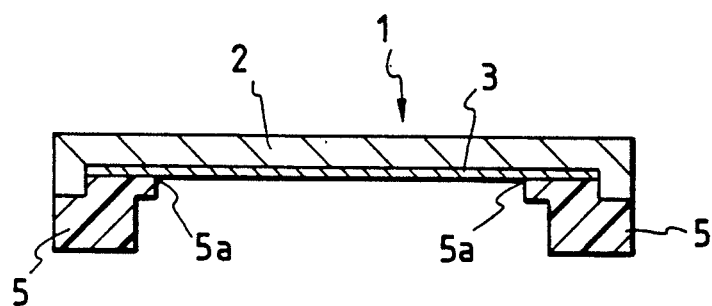
FIG. 7 is a horizontal sectional view of the in-mold decorated illumination panel in the prior art.
Figure 8:
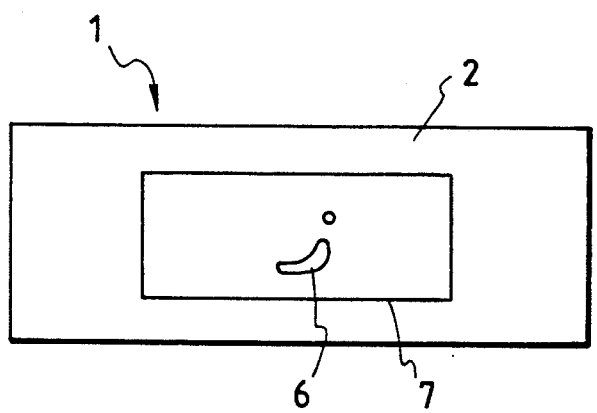
FIG. 8 is a front elevational view of the panel shown in FIG. 7, illustrating the dissolution of ink out of the indicator symbol.
Figure 9:
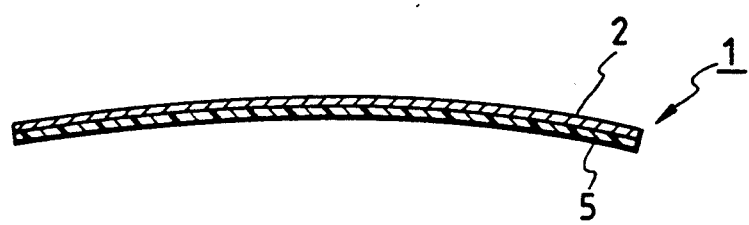
FIG. 9 is a sectional view of the in-mold decorated illumination panel in the prior art, illustrating the warping of the panel.

There will now be described a preferred embodiment of the present invention with reference to FIGS. 1 to 6, in which the same reference numerals as those in FIGS. 7 to 9 designate the same parts, and the detailed explanation thereof will be hereinafter omitted.

Figure 1:
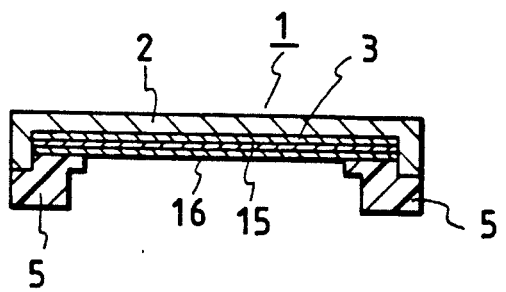
FIG. 1 is a horizontal sectional view of a preferred embodiment of the in-mold decorated illumination panel according to the present invention.
Figure 2:
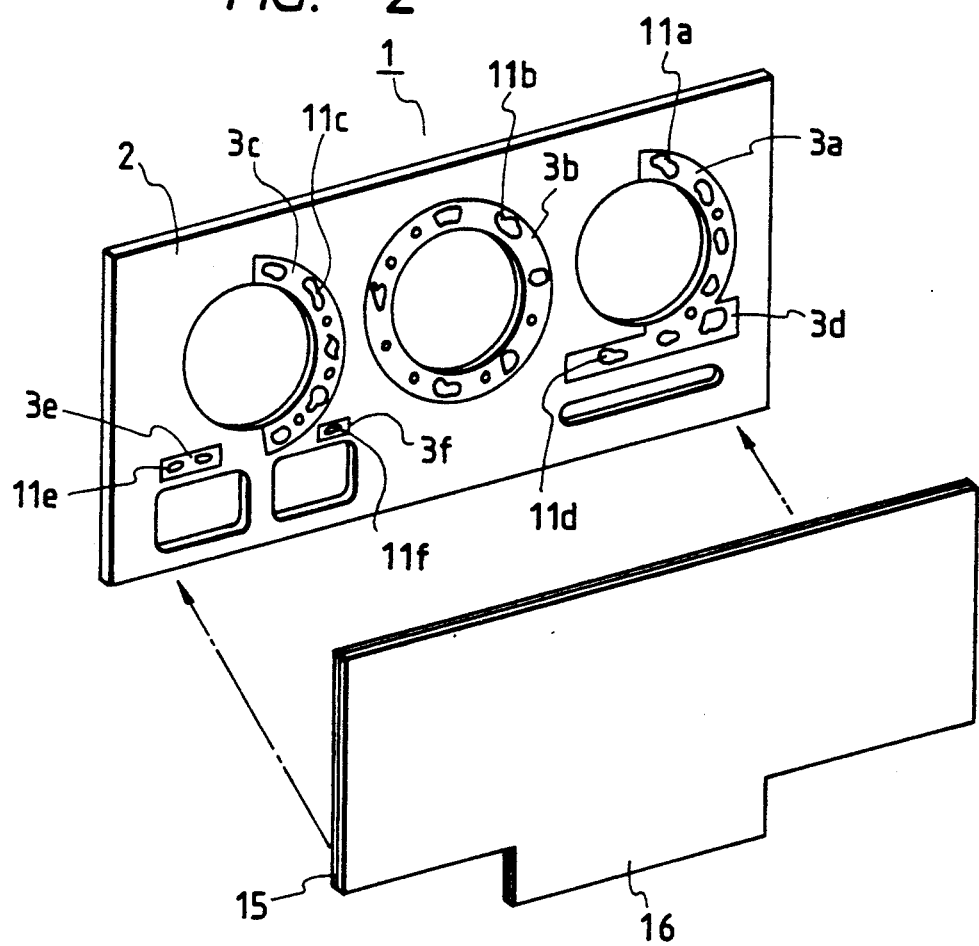
FIG. 2 is a perspective view of the indicator sheet before attaching the ink dissolution preventing sheet thereto.
Figure 3:
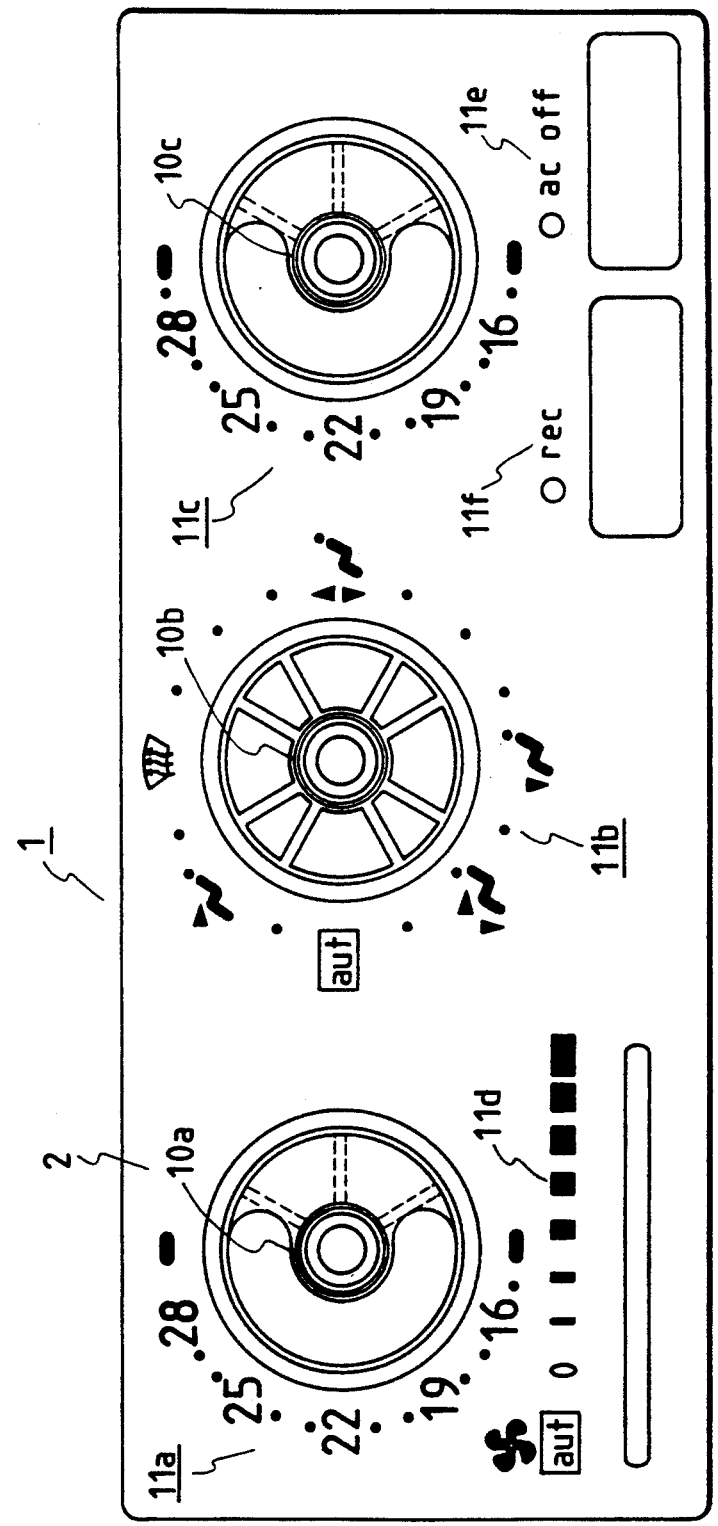
FIG. 3 is a front elevational view of the indicator sheet.

As shown in FIG. 3, the present invention is applied to a display panel of an air conditioner for an automobile in the preferred embodiment. In FIG. 3, reference numeral 1 generally designates an in-mold decorated illumination panel having an indicator sheet 2. A plurality of holes 10a, 10b and 10c for receiving adjusting knobs (not shown) are provided on a front surface of the indicator sheet 2. A pair of left and right indicator symbols 11a and 11c for indicating operational conditions of the air conditioner to be respectively selected by left and right knobs (not shown) are provided around the holes 10a and 10c, respectively. A central indicator symbol 11b for indicating a blowing condition of the air conditioner to be selected by a central knob (not shown) is provided around the hole 10b. Furthermore, an indicator symbol 11d for indicating a blowing strength is provided below the hole 10a, and indicator symbols 11e and 11f for indicating a power condition are provided below the hole 10c. As shown in FIG. 2, these indicator symbols are formed by an ink printed layer 3 including a plurality of ink printed layers 3a to 3f provided on a back surface of the indicator sheet 2. As shown in FIGS. 1 and 2, an ink dissolution preventing sheet 16 is attached through a double-sided adhesive tape 15 as attaching means onto the ink printed layer 3, and a molded layer 5 is formed on the ink dissolution preventing sheet 16 by injection molding. The ink dissolution preventing sheet 16 is formed from a transparent material such as a transparent polycarbonate resin.

Figure 4:
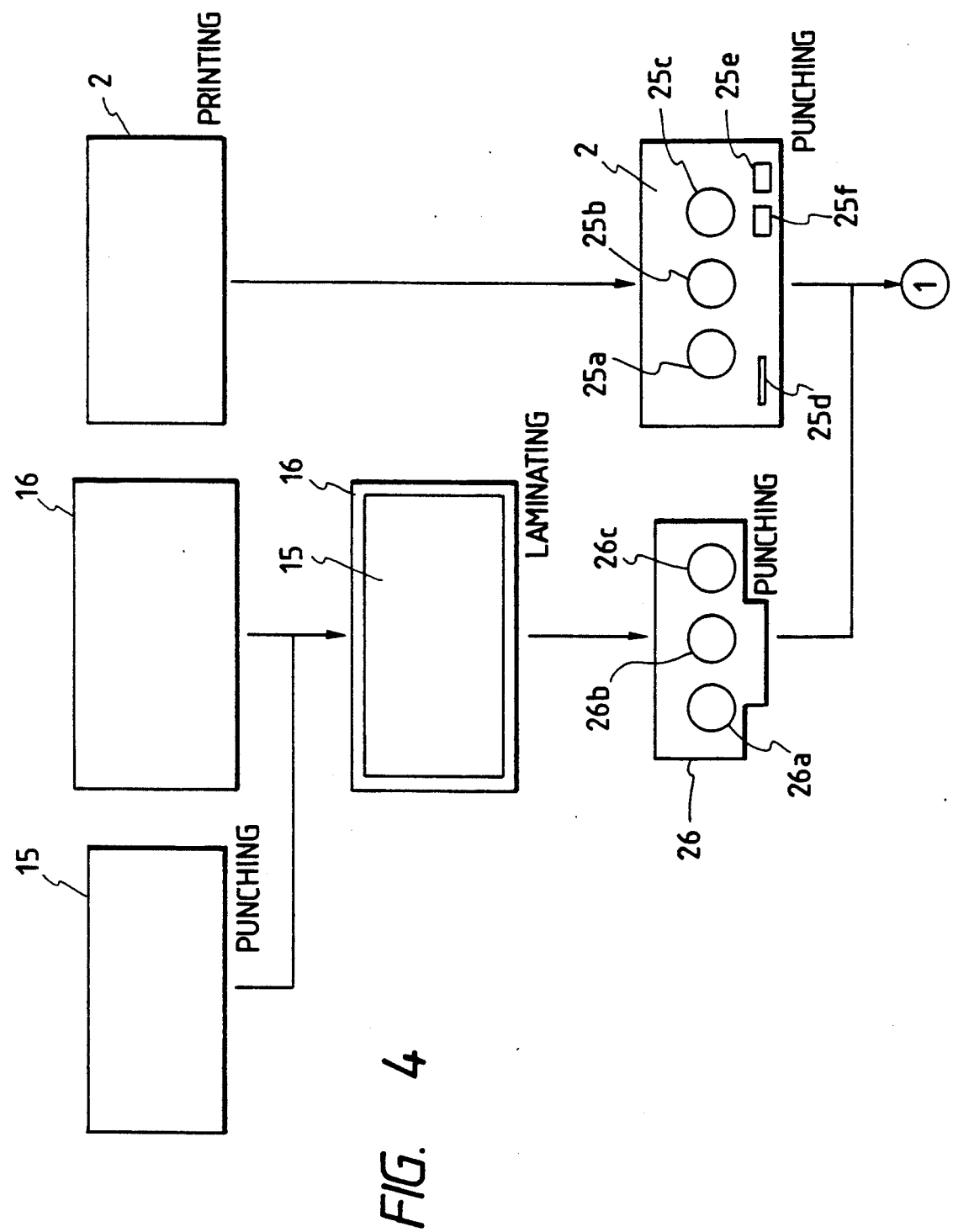
FIGS. 4 and 5 are schematic flow diagrams illustrating the steps of a manufacturing method for the in-mold decorated illumination panel.
Figure 5:
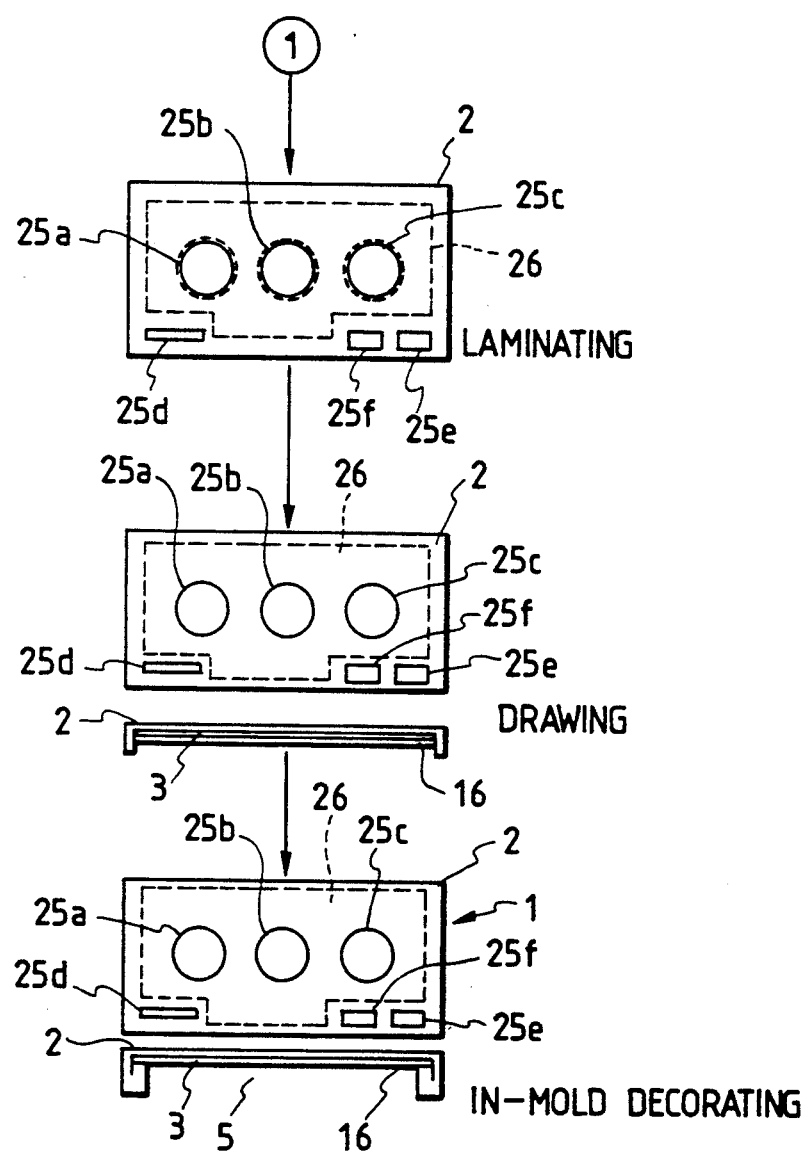

A manufacturing method for the in-mold decorated illumination panel 1 of the preferred embodiment will now be described with reference to FIGS. 4 and 5 illustrating the manufacturing steps of the preferred embodiment. Referring to FIG. 4, the indicator sheet 2 formed of a resin material having a thickness of 0.38 mm is punched to form a plurality of apertures 25a to 25f for mounting parts such as knobs, and the ink printed layer 3 including the indicator symbols 11a to 11f is formed on the back surface of the indicator sheet 2 at predetermined positions. On the other hand, the double-sided adhesive tape 15 is fixedly laminated on the ink dissolution preventing sheet 16 formed of a transparent resin material having a thickness of 0.3 mm, and the laminated member thus obtained is punched to form a punched sheet 26 having a plurality of apertures 26a to 26c corresponding to the apertures 25a to 25c of the indicator sheet 2 and having an outline so as to cover the ink printed layer 3 formed on the indicator sheet 2. Thereafter, as shown in FIG. 5, the punched sheet 26 is fixedly laminated through the double-sided adhesive tape 15 onto the back surface of the indicator sheet 2 so as to cover the ink printed layer 3 formed on the back surface of the indicator sheet 2. Then, the indicator sheet 2 on which the punched sheet 26 is fixed is drawn, and thereafter the molded layer 5 is formed on the ink dissolution preventing sheet 16 of the punched sheet 26 by injection molding, thus obtaining the in-mold decorated illumination panel 1. An illumination lamp (not shown) is located behind the in-mold decorated illumination panel 1, so that the indicator symbols 11a to 11f are clearly indicated with their respective colors on the front surface of the panel 1 by means of back light from the illumination lamp.

In forming the molded layer 5 of the in-mold decorated illumination panel 1 by injection molding in the case that the panel is large in size, a large amount of molten resin is injected to apply a large pressure upon injection molding. However, the pressure of the molten resin is received by ink dissolution preventing sheet 16, and it is not directly applied to the ink printed layer 3. Therefore, the ink of the indicator symbols 11a to 11f is completely prevented from being dissolved away, and no defectives having unclear indication are provided.

In the molding step for the molded layer 5 in the preferred embodiment, a metal mold temperature is maintained at about 70° C., and a glass fiber as the shrinkage adjusting material is mixed with the molten resin which is molten at 240° C. The molten resin thus containing the glass fiber is injection-molded onto the back surface of the indicator sheet 2 to form the molded layer 5 on the indicator sheet 2.

Figure 6:
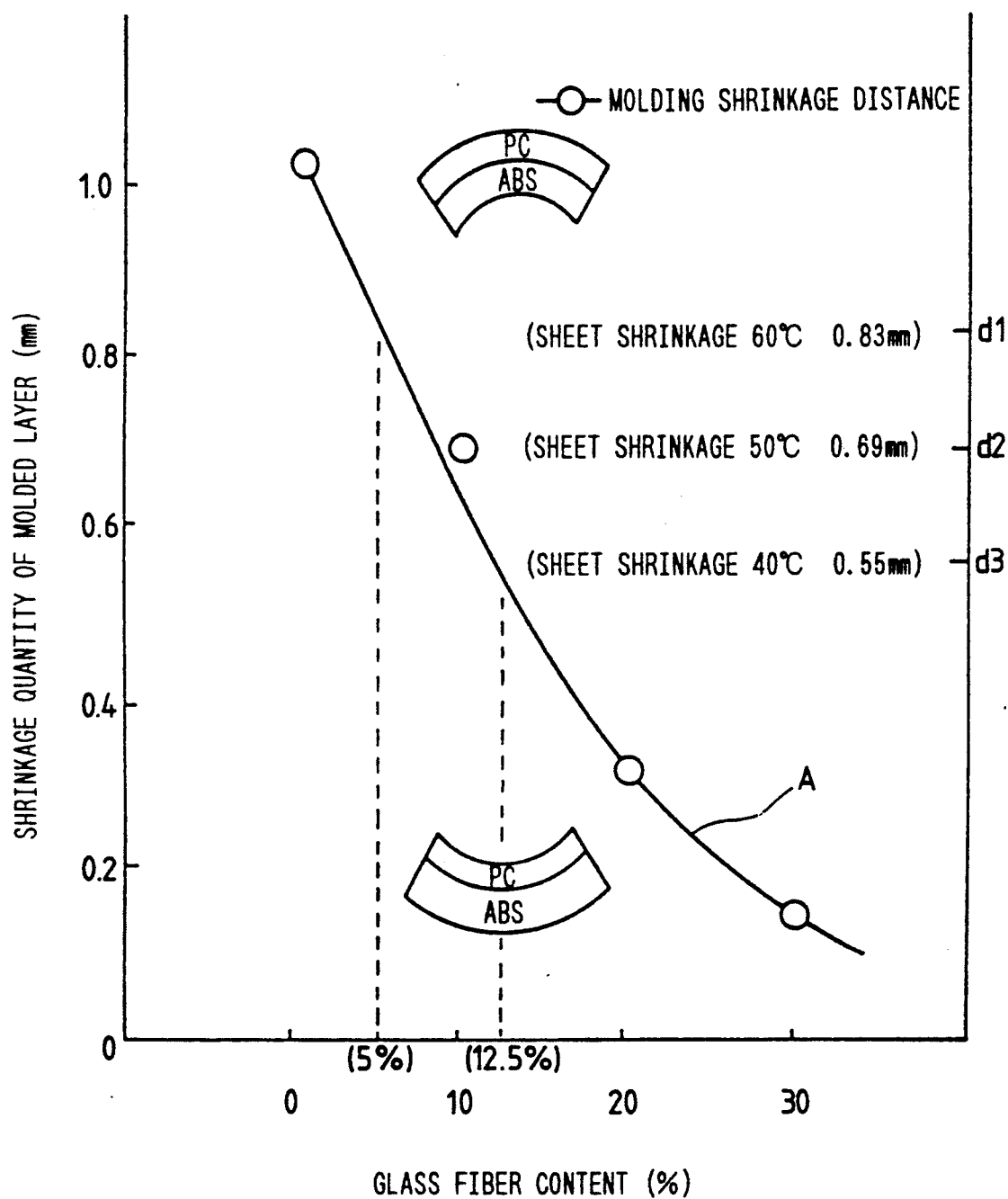
FIG. 6 is a characteristic graph illustrating the relation between a shrinkage rate of the molded layer and a content of the shrinkage adjusting material.

As shown in FIG. 6, it is understood that a degree of inhibition of shrinkage such that the shrinkage of the molded layer 5 is inhibited by the glass fiber dispersed in the molded layer 5 increases with an increase in content of the glass fiber mixed in the molded layer 5. That is, a shrinkage quantity of the molded layer 5 decreases with an increase in content of the glass fiber as shown by a curve A in FIG. 6. The shrinkage quantity of the molded layer 5 in this case is represented as a value (mm) in respect of a length of 204 mm of the indicator sheet 2. As the metal mold temperature is maintained at about 70° C. as previously mentioned, the temperature of the indicator sheet 2 increases up to about 70° C. to expand in the molding step, and thereafter the temperature of the indicator sheet 2 decreases down to a room temperature. When the room temperature is 10° C., 20° C., or 30° C., a temperature difference between the metal mold temperature and the room temperature is 60° C., 50° C., or 40° C., respectively. In this case, a shrinkage quantity of the indicator sheet 2 due to the above temperature difference becomes 0.83 mm (shown by d1), 0.69 mm (shown by d2), or 0.55 mm (shown by d3), respectively. Therefore, when the room temperature is 10° C., for example, it is necessary to set a shrinkage quantity of the molded layer 5 to 0.83 mm so that it may become equal to the shrinkage quantity (d1=0.83 mm) of the indicator sheet 2. Accordingly, in this case, the content of the glass fiber becomes 5% which is obtained from an intersection between a horizontal straight line drawn from the shrinkage quantity d1=0.83 mm and the curve A. In this way, the shrinkage quantity of the molded layer 5 can be made substantially equal to the shrinkage quantity of the indicator sheet 2, thereby preventing warping of the in-mold decorated illumination panel 1. Similarly, it is apparent that the content of the glass fiber is to be set to 8.5% at the room temperature of 20° C. or 12.5% at the room temperature of 30° C.

Although a molding material constituting the molded layer 5 is formed from ABS resin, and the shrinkage adjusting material to be mixed with the molding material is formed from a glass fiber (e.g., GR-2000) in the preferred embodiment, these materials are merely illustrative and not limitative in the present invention. For example, the molding material may be formed from PBT, polyacetal, PPS, PP, nylon, FR-PET, etc., and the shrinkage adjusting material may be formed from glass bead, wood powder, asbestos, cotton flock, mica, flake fabric, cord, lug, alpha cellulose, cellulose flock, etc.

As mentioned above, the shrinkage adjusting material for adjusting a shrinkage quantity of the molded layer 5 after injection molding is mixed in the molded layer 5 with a desired content. Accordingly, a shrinkage rate of the molded layer 5 with respect to a shrinkage rate of the indicator sheet 2 can be adjusted to a desired value, so that the occurrence of warping of the in-mold decorated illumination panel 1 can be prevented, or desired warp can be provided for the panel 1.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. In an in-mold decorated illumination panel including an indicator sheet, an ink printed layer formed on a back surface of said indicator sheet, said ink printed layer having a printed indicator portion, and a molded layer formed on a back surface of said ink printed layer by injection molding, wherein said printed indicator portion is illuminated from the back surface of said ink printed layer to effect indication of said printed indicator portion on a front surface of said indicator sheet; the improvement comprising a transparent ink dissolution preventing sheet interposed between said ink printed layer and said molded layer for preventing ink of said ink printed layer from being dissolved and transferring to said molded layer during said injection molding.

2. In an in-mold decorated illumination panel including an indicator sheet, an ink printed layer formed on a back surface of said indicator sheet, said ink printed layer having a printed indicator portion, and a molded layer formed on a back surface of said ink printed layer by injection molding, wherein said printed indicator portion is illuminated from the back surface of said ink printed layer to effect indication of said printed indicator portion on a front surface of said indicator sheet; the improvement wherein a shrinkage adjusting material for adjusting shrinkage of said molded layer is mixed in said molded layer in an amount such that a shrinkage rate of said molded layer becomes equal to a shrinkage rate of said indicator sheet after said injection molding, thereby preventing warping of said panel caused by unequal shrinkage of said indicator sheet and said molded layer after said injection molding.

3. The in-mold decorated illumination panel of claim 1 wherein the transparent ink dissolution preventing sheet is made of polycarbonate resin.

4. The in-mold decorated illumination panel of claim 2 wherein the shrinkage adjusting material is glass fiber.

* * * * *